(12) United States Patent
Zhang et al.

(10) Patent No.: US 7,404,185 B2
(45) Date of Patent: Jul. 22, 2008

(54) METHOD AND APPARATUS OF ADAPTIVE INTEGRATION ACTIVITY MANAGEMENT FOR BUSINESS APPLICATION INTEGRATION

(75) Inventors: Liang-Jie Zhang, Cortlandt Manor, NY (US); Yu Long, Alachua County, FL (US); Tian-Jy Chao, Bedford, NY (US); John Y. Sayah, Sleepy Hollow, NY (US); Hung-Yang Chang, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/724,879

(22) Filed: Dec. 2, 2003

(65) Prior Publication Data

US 2005/0120353 A1   Jun. 2, 2005

(51) Int. Cl.
*G06F 9/44* (2006.01)
(52) U.S. Cl. ...................................... 719/310; 719/318
(58) Field of Classification Search ................. 719/310, 719/318; 705/1, 14; 709/223; 707/10, 100, 707/101; 717/105–108
See application file for complete search history.

(56) References Cited

U.S. PATENT DOCUMENTS

| | | | |
|---|---|---|---|
| 6,389,588 B1 * | 5/2002 | Wadhwa et al. ............. 717/106 |
| 6,473,794 B1 * | 10/2002 | Guheen et al. .............. 709/223 |
| 6,519,571 B1 * | 2/2003 | Guheen et al. ................ 705/14 |
| 6,615,166 B1 * | 9/2003 | Guheen et al. ................ 703/27 |
| 6,721,713 B1 * | 4/2004 | Guheen et al. ................. 705/1 |
| 7,257,818 B2 * | 8/2007 | Foerg et al. ................. 719/310 |
| 7,257,820 B2 * | 8/2007 | Fischer et al. .............. 719/316 |
| 7,269,795 B2 * | 9/2007 | Whittenberger ............. 715/764 |
| 2004/0133876 A1 * | 7/2004 | Sproule ....................... 717/105 |
| 2004/0254945 A1 * | 12/2004 | Schmidt et al. ............. 707/100 |
| 2005/0119905 A1 * | 6/2005 | Wong et al. ..................... 705/1 |
| 2005/0125449 A1 * | 6/2005 | Wong et al. .............. 707/104.1 |

* cited by examiner

*Primary Examiner*—Van H Nguyen
(74) *Attorney, Agent, or Firm*—Whitham, Curtis, Christofferson & Cook, PC; Stephen C. Kaufman (57) ABSTRACT

An adaptive integration activity management framework for on demand business process integration provides a mechanism to enable easy integration of legacy and new applications. The framework minimizes the effort need to integrate a new application into an existing business process environment such that the new activity is a "plug-in" into an action manager by implementing a standard adaptation layer. Activity integration is implemented in the principle of "on-demand" because it is invoked as required, so the communication and collaboration between partners become much more flexible.

7 Claims, 4 Drawing Sheets

METHOD AND APPARATUS OF ADAPTIVE INTEGRATION ACTIVITY MANAGEMENT FOR BUSINESS APPLICATION INTEGRATION

CROSS-REFERENCE TO RELATED APPLICATION

The subject matter of this application is related to U.S. patent application Ser. No. 10/665,699 filed Sep. 19, 2003, by Liang-Jie Zhang, John Sayah, Tian Chao, Ying Nan Zuo, Shun Yang, Jing Min Xu, and Yiming Ye for "Method and Apparatus of Information HyperChain Management for On-Demand Business Collaboration" and assigned to a common assignee herewith. The disclosure of application Ser. No. 10/665,699 is incorporated herein by reference.

BACKGROUND OF THE INVENTION

1. Field of the Invention

The present invention generally relates to business software integration and, more particularly, to an adaptive integration activity management framework for on demand business process integration.

2. Background Description

The emergence of Web Service paves the way for easy integration of various applications from multiple platforms. An example of such business process integration is to use standard interface such as Web Services Definition Language (WSDL) to enable multiple monolithic applications to work together in a loosely coupled but controlled flow to achieve a business goal. However, several problems in business process integration area are observed. One of them is that such actual integration between applications still has to be pre-defined or hard-wired, thus preventing adaptation to new business process integration requirements later on. It is also observed that some of the goals for business process integration are to enable easy integration of legacy and new applications.

In current state-of-the-art application integration, there is no standard. Most of the application systems have been integrated in a dedicated, one-to-one type of scenario via application adaptor. That is, for each new application to be integrated, a dedicated adaptor is developed to enable integration. In addition, there is no reusability, i.e., for each new integration case, the same set of customization is repeated again for the one-of-a-kind integration. Obviously, this kind of approach is labor intensive and does not scale well.

We have identified the challenging issues for the current business process integration as follows:

Lack a uniform representation to capture detailed requirements of each application integration activity, such as method names, input and output parameter formats, etc. for the application to be integrated with.

Again, such integrations have been done in dedicated and hard-wired manner.

Lack adaptation in business process integration of a new application.

For each new integration activity, considerable amount of programming work has to be done on the middle-ware infrastructure to develop, test and incorporate the new adaptor, and then be able to invoke the new application.

Lack flexibility to support business process integration at a different granularity, i.e. all integrations are fixed and pre-defined for a specific purpose and integration environment.

Lack flexible mechanism to express the conditions between integration activities. For example, above a certain threshold, one integration activity, e.g. FTP (File Transfer Protocol), is to be invoked, otherwise, switch to the other activity, e.g. GridFTP.

SUMMARY OF THE INVENTION

It is therefore an object of the present invention to provide a novel mechanism to enable easy integration of legacy and new applications.

It is another object of the invention to minimize the effort need to integrate a new application into an existing business process environment.

According to the invention, an adaptive integration activity management framework is used for on demand business process integration. In the collaborative business processes, such as design collaboration, processes typically require a multitude of document types being exchanged across virtual teams of various organizations and enterprises. Co-pending application Ser. No. 10/665,699 proposes, among other things, the use of collaborative messages or CxP (Collaborative exchange Protocol) messages to specify business exchanges. CxP are a set of business constructs composed by a set of predefined collaboration primitives. They capture and automate business collaboration interaction patterns for information exchange based on annotated messages, which are atomic CxP elements. A CxP message is defined as a rudimentary exchange of information between trading partners. Multiple choreographed CxP messages form a collaboration primitive, such as RFD (Request for Design) primitive. Using CxP business constructs as building blocks, a business collaboration scenario can be composed to represent a sequence of a complex interactions between business partners such as Enterprise Resource Planning (ERP), Product Development Management (PDM), or Supply-Chain management (SCM).

This invention provides an alternative way to high cost and labor-intensive one-to-one application integration. Not only can the new activity be "plug-in" into our action manager by implementing the standard adaptation layer, but also the activity integration is implemented in the principle of "on-demand" because it is invoked as required. So the communication and collaboration between partners become much more flexible.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
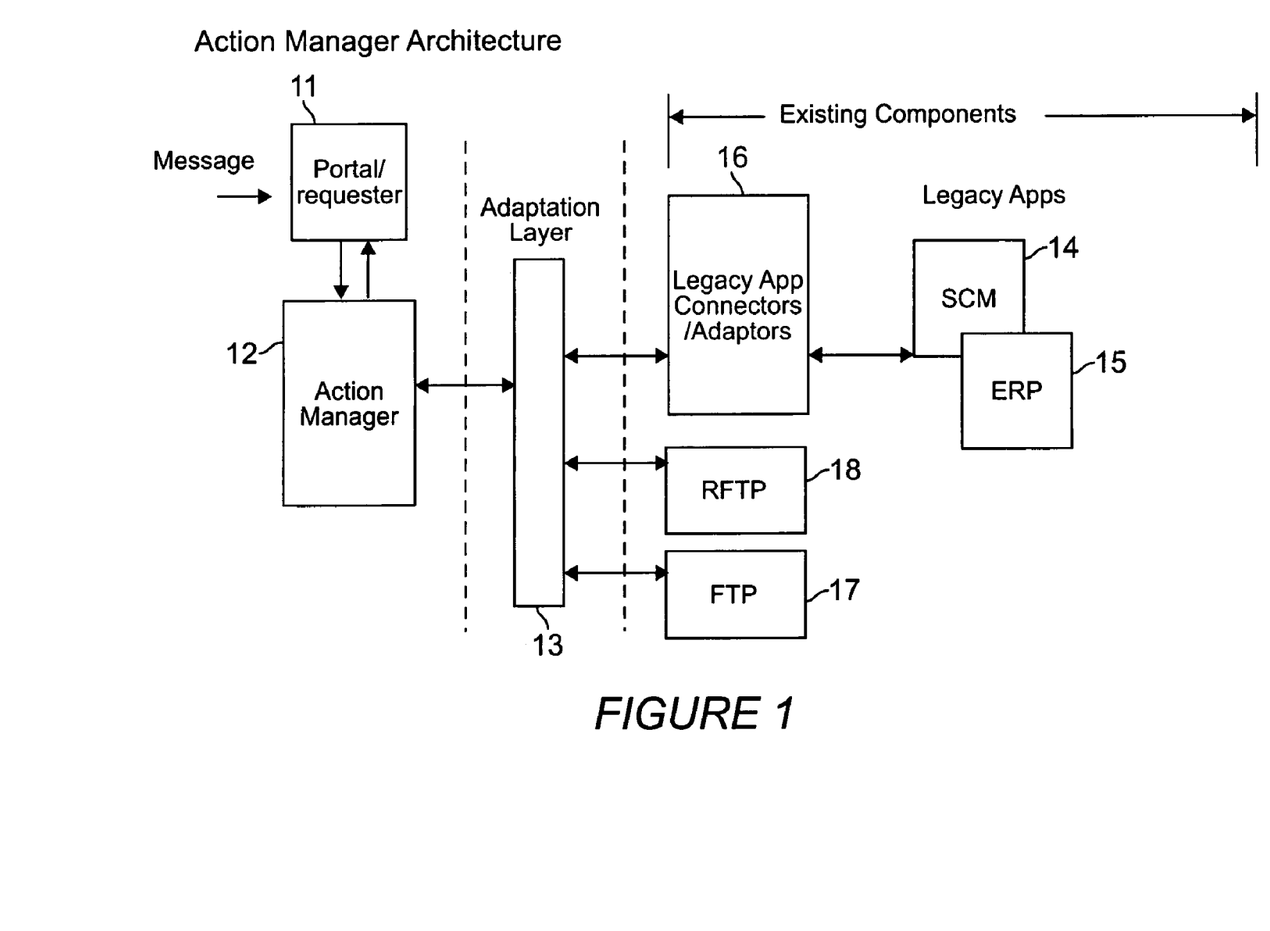
FIG. 1 is a block diagram illustrating the architecture of the framework for on demand business process integration according to the invention.

Referring now to the drawings, and more particularly to FIG. 1, there is shown a block diagram of the adaptive integration activity management framework for on demand business process integration according to the invention. The architecture is roughly divided into three parts: 1) the input receiving and processing components, comprising the portal/ requester 11 that receives incoming messages, and the action manager 12 that parses and processes the messages, 2) the adaption layer 13 that provides the interface between the action manager 12 and existing components, 3) and the existing components, which may include legacy applications such as SCM (Supply Chain Management) 14 and ERP (Enterprise Resource Planning) 15 and legacy application connectors/ adaptors 16, FTP (File Transfer Protocol) 17, and RFTP (Reliable File Transfer Protocol) 18, and the like. The idea is to integrate the three parts without having to change the first part (ActionManager) and the third part (existing components) by supplying only the implementation of the adaptation layer (the second part) for a specific integration activity of an application to be integrated.

The action manager 12, which is the engine of the framework, receives collaborative messages (or CxP "Collaborative Exchange Protocol" messages) from a design partner side, which can be a Web portal. Each message contains meta data or annotations describing the documents to be exchanged, such as the file name, size, author, application to use to open the design file, etc. In addition, annotations can also specify integration activities to be performed, representing new application to be integrated, such as FTP, reliable file transfer (RFT) or an invocation to an legacy adaptor. Also, an alternative data source to the Action Manager, in addition to collaborative messages, is an RDF string. The adaptation layer 13 is an integration layer that provides isolation from the action manager 12 to the applications to be integrated. There is a pre-defined adaptation layer interface that the action manager 12 knows about and can invoke the methods of the adaptation layer when an implementation of the interface is in place. When there is a new integration activity for an application, this requires an implementation of an adaptation layer, or an adaptor, for that application using the pre-defined adaptation layer interface. The newly implemented adaptation layer 13 will be able to get "plugged-in" to the action manager, which can automatically invoke the standard method defined in the interface for the adaptor, which in turn invokes the new application. Notice that neither the action manager nor the application needs to be modified for this integration to take place.

There is an "on-demand" aspect in the integration activity, i.e., the activity can be specified dynamically via the meta data or annotation at runtime. The value of the activity can be any of a range of integration activities that the receiving partners can support, i.e., having an adaptation layer built and deployed. That is, when a sender is creating a collaborative message to send to the receiving partner, the sender can "optionally" specify what type of integration action is needed as part of the collaborative message. The integration action does not need to be pre-defined in a schema to be sent. In addition, a different instance of the same type of collaborative message can have different actions as well. This is because a collaborative message accounts for any number of annotations that communicating parties can understand, and an action is just one of the understood annotations. Thus, the integration can be optionally specified by the sender, and understood and processed by the receiver. On the other hand, if a sender were to send an RosettaNet or EDI (Electronic Data Interchange) message, there must be a message that already specifies the integration action as part of the message to be understood and processed by the receiver, which is not flexible. Therefore, EDI or RosettaNet do not provide the agility and flexibility required by collaborative business processes for their limitation to the rigid data models. Furthermore, the design collaboration process is creative and dynamic; it is not possible to pre-define all actions ahead of time. The approach taken by this invention gives the design partner or trading partner a more flexible way to trigger a new or different integration activity at any on need basis. The sender is not restricted to only a certain type of collaborative message that can trigger a certain type of integration activity, thus enabling the on-demand capability.

Figure 4:
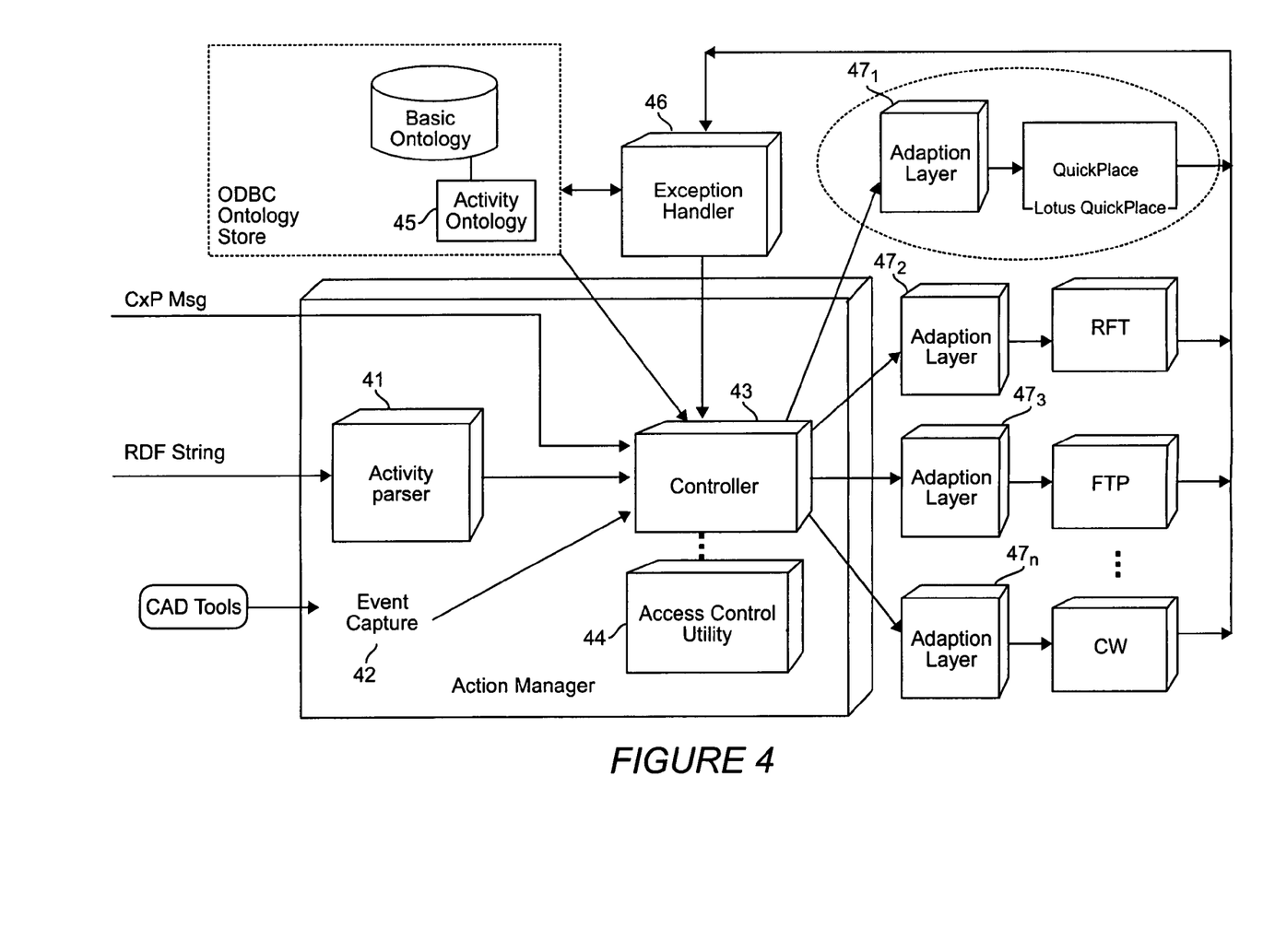
FIG. 4 is a block diagram of the Action Manager's components.

The ActivityChain ontology 45 that guides the action manager 12 provides flexibility and granularity for an adaptive and on-demand mechanism to integrate new applications to an existing environment. The ActivityChain ontology is based on Resource Description Framework (RDF), which is a W3C Recommendation for describing resources and defined in DAML+OIL language. The ontology provides the scheme for runtime RDF annotation exchange.

According to Natalya F. Noy and Deborah L. McGuinness in *Ontology Development 101: A Guide to Creating Your First Ontology*

(http://proteg.stanford.edu/publications/ontology_development/ontology101-noy-mcguinnes.html) ontology provides a formal explicit description of concepts in a domain of discourse (or called classes, concepts), properties of each concept describing various features and attributes of the concept (or called slots, roles, properties), and restrictions on slots (or called facets, role restrictions).

Ontology provides a formal explicit description of concepts in a domain of discourse (or called classes, concepts), properties of each concept describing various features and attributes of the concept (or called slots, roles, properties), and restrictions on slots (or called facets, role restrictions).

Ontology provides the following purposes:
1. To share common understanding of the structure of information among people or software agents
2. To enable reuse of domain knowledge
3. To make domain assumptions explicit
4. To separate domain knowledge from the operational knowledge
5. To analyze domain knowledge And we believe high-level business process integration knowledge can be separated from the "operational" hard code and captured in terms of ontology and thus be reused among different software components. Further, a business process integration condition is captured explicitly by ontology, which makes the monitoring and self-managing possible. Our ActivityChain ontology is an instance of ontology in the business process integration domain.

ActivityChain ontology can be used in three ways. First, it can describe business process flow which is a set of coordinated activities. Second, it can be used during development where adaptation layers are built according to the ActivityChain ontology. Third, it can be used during runtime for action manager 12 to consult the ActivityChain ontology to ensure the correct definitions are used as defined in ActivityChain ontology.

Our ActivityChain ontology defines terms and conditions in a design process integration scenario as well as supports a flexible enabling infrastructure for business process integration. The key difference between our ActivityChain and the traditional work-flow is in traditional work-flow the sequence of activities is fixed and unchanged but in our ActivityChain the sequence is determined on the fly and can change at any time.

Figure 2:
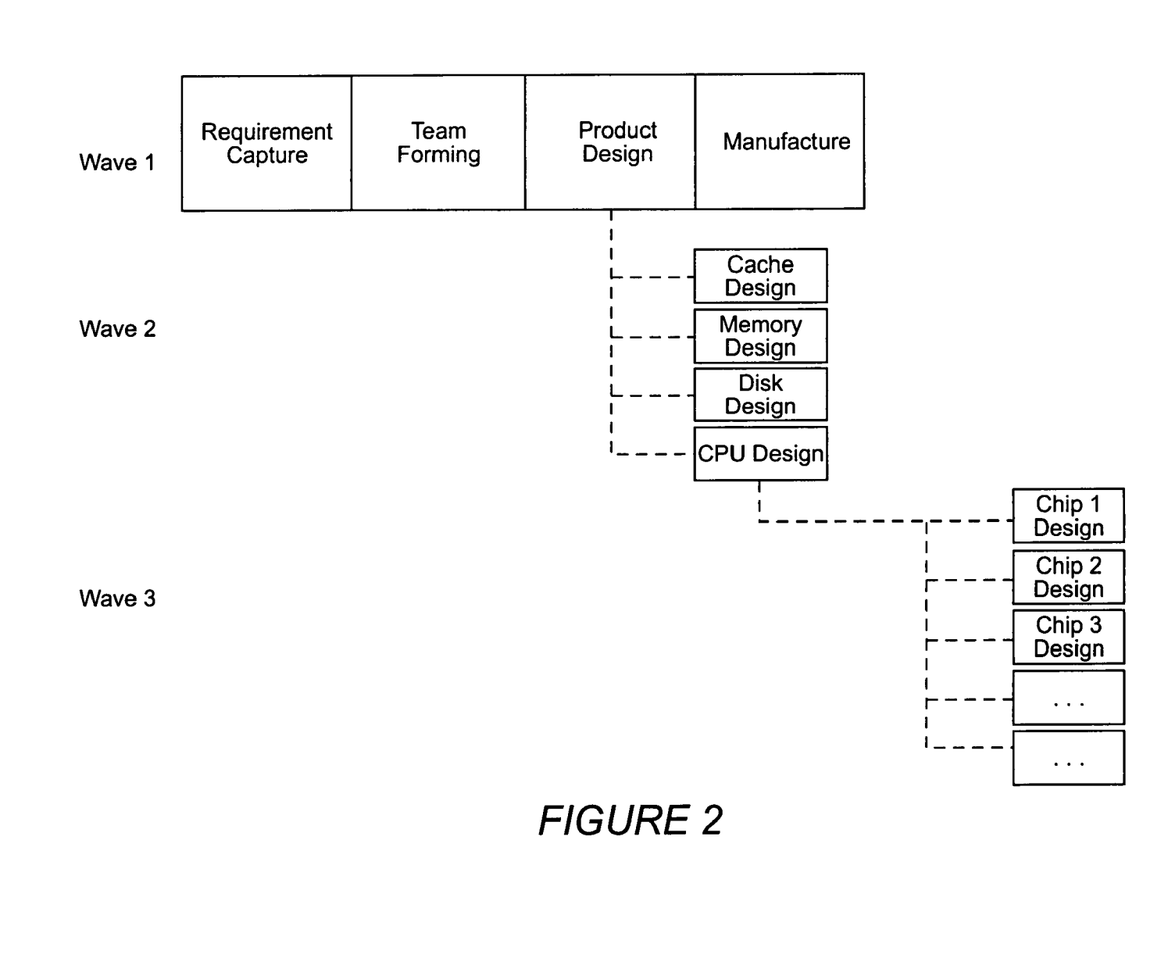
FIG. 2 is a block diagram showing an example Activity-Chain ontology used in design collaborative process.

FIG. 2 shows how ActivityChain ontology is used to capture the activities-based business process flow in a design process integration scenario. This is a diagram showing a scenario that ActivityChain ontology can be used in design of a collaborative process. Wave 1, Wave 2, Wave 3 represents an outline procedure of a new product design, e.g., a new notebook computer model design. The overall design follows a top-down approach. As time goes from Wave 1 to Wave 2, to Wave 3, the broad design goals become more clear and more detailed. But the timeline of Wave 1, Wave 2 and Wave 3 are not strictly separated. Sometimes a design change in Wave 3 may bring back and incur changes in Wave 2, even Wave 1.

Wave 1 is the high-level design stage. Staffing from the left block, to design a new notebook computer model, the first step is to collect the design requirements from a broad range of customers. We called this step Requirement Capture. After that, a design team will be formed. Next step is to start Product design. But at this time, the product designs are limited to the high-level goals for new notebook computer model, like the performace metric goals, appearance, etc. After all the designs are completed, they are sent to be manufactured.

Wave 2 is where the broad goal in Wave 1 becomes more detailed. We use Product Design in Wave 1 to explain how it happens. Product Design is now decomposed into Motherboard Design, Memory Design, Disk Design, CPU Design, etc. Now the design goals for each big part are specified.

Wave 3 is where the design in Wave 2 becomes more clear. For example, CPU Design is now detailed to how Chip 1 is designed, how Chip 2 is designed, etc. The dotted line is used instead of solid line is because the relationship is decided at run time and allows feedback to happen.

We believe that our ActivityOntology is a very good tool to capture the dynamic behaviors in the design collaborative process above. We show an example of this usage as follows: For example, in Wave 2 the CPU design can be decomposed into Chip 1 design, Chip 2 design, Chip 3 design, etc. At this level, the designer may only know the set of outsourcing candidates for doing Chip 1 design and could not decide which one is picked yet. So the CPU design process in Wave 2 only specified that the most reliable and most reasonable price design partner will be picked for Chip 1 design. Coming down to Wave 3, all the Chip 1 design candidates will be contacted and the best Chip 1 design partner will be selected. After the selecting process, the CPU design process is detailed to which design partner will do the Chip 1 design in Wave 3.

As described in copending patent application Ser. No. 10/665,699, the activity annotation for integration is independent of the high-level annotation associated with the messages and is only referred as a link. Therefore, the activity annotation can be flexibly specified in any granularity. For example, activity annotations can be associated with a CxP message to indicate actions to be performed as part of the messaging processing, such as upload retrieved document to a centralized team room. Activity annotations can also be associated with a document referenced by a CxP message to indicate actions to be performed on the document, such as review the document or send it to another server using FTP. Since the activity annotation is retrieved as needed or on-demand basis to invoke the integration action at runtime, this effectively makes it a dynamic business process flow. Flexible linkage is used to capture the condition between the individual activity ontology. So when an exception or other certain things happen, the action manager 12 can act correspondingly.

Figure 3:
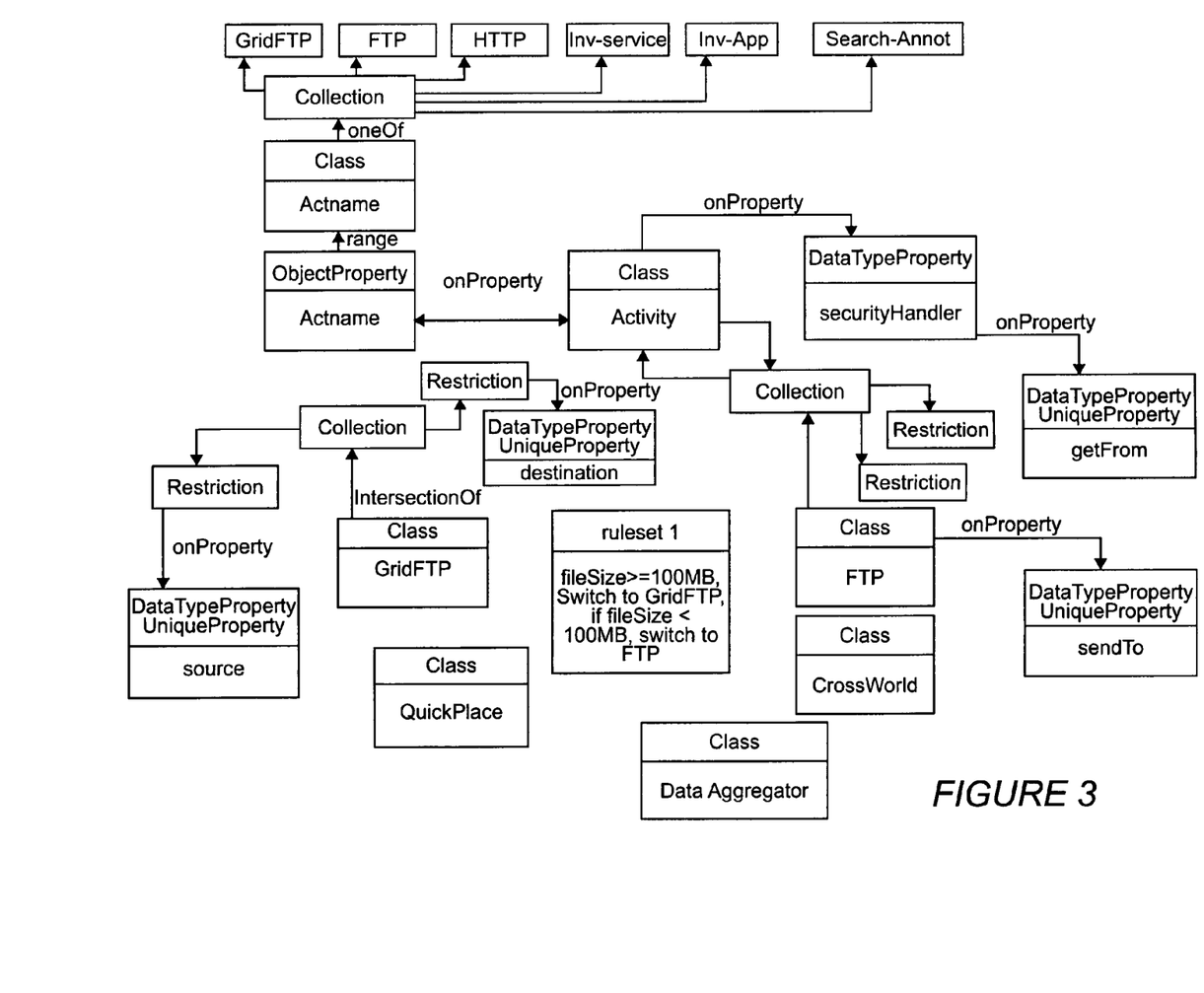
FIG. 3 is a block diagram illustrating the logical architecture of the ActivityChain ontology space.

The logical structure of ActivityChain ontology is shown in FIG. 3. The top-level entity is Class Activity. It has a DataTypeProperty securityHandler and an ObjectProperty aetname. The ObjectProperty aetname has a range which is Class Actname. And Actname is a collection which enumerates GridFTP,FTP, HTTP, Inv-service, Inv-Appl and Search-Annot.

The Class Activity has several subClasses GridFTP, FTP, QuickPlace, CrossWorld, DataAggregator, etc. In FIG. 3, we only show the details about GridFTP and FTP.

In DAML+OIL syntax, subClasses are specified as a collection that inherits the superClass with some restriction on certain properties. Thus, subClass GridFTP is a collection that inherits Class Activity with two DataTypeProperty restrictions. One is source and the other is destination. These properties have to be unique for this class. Similarly subClass FTP is a collection that inherits Class Activity with two DataTypeProperty restrictions. One is getFrom and the other is sendTo. They have to be unique, too.

GridFTP and FTP have the same function of doing file transfer. GridFTP is more efficient but more complex. So we extends the DAML+OIL for our own purpose to specify the rule of competing relationship between GridFTP and FTP. The rule is specified by SRML(Simple Rule Markup Language). That is, when fileSize is greater or equal to 100 MB, we use GridFTP. Otherwise, use FTP.

Inside the ActivityChain ontology we also have ruleset1 to specify the competition condition between GridFTP and FTP as follows.

If FileToTransfierfileSize>=100 MB, switch to GridFTP.

If FileToTransfierfileSize<100 MB, switch to FTP.

The above figure can be captured in our ActivityChain ontology as follows:

TABLE 1

Activity Ontology Representation Example

```
<?xml version="1.0 "?>
<rdf.RDF
    xmlns:rdf-"http://www.w3.org/1999/02/22-rdf-syntax-ns#"
    xmlns:rdfs="http://www.w3.org/2000/0 I /rdf-schema#"
    xmlns:daml="http://www.dami.org/200I/10/daml+oil#"
    xmlns:xsd="http://www.w3.org/2000/10/XMLSchema#" >
  <daml:Ontology rdf about="">
    <daml:versionInfo>Version 0. 1, 2003/8/4</darnl:versionInfo>
    <rdfs:comment>Ontology for Adaptive Activity Management for On
Demand Business Process Integration</rdfs: comment>
    <daml:imports
    rdf-.resource--"http://www.dami.org/200I/10/daml+oil"/>
  </daml:Ontology>
  <daml:Class rdfID="Activity">
        <daml: on Property rdf.-rcsourcc=Vactname"/>
        <daml:onProperty rdf.resource="#securityHandler "/>
        <daml:onProperty
rdf.resource="http://~kww.ydt.com/dc/directory/ruiesct#ruleset1 >
  </daml:Class>
  <daml:ObjectProperty rdf ID="act name">
        <rdf-.range rdf.-resource="#Actname">
  <daml:ObjectProperty>
  <daml:Class rdf.ID="Actname">
        <daml:oneOf rdf.parseType--"daml:collection">
            <Actname rdf.ID="GridFTP">
            <Actname rdfID="FTP">
            <Actname rdf.ID="HTTP">
            <Actname rdf.ID="lnv-service">
            <Actname rdfID="Inv-Appl"/>
            <Actname rdf ID="Search-Annot">
        </daml:oneOf>
  </daml:Class>
  <daml:DatatypeProperty rdf:ID="sccurityHandJer">
        <rdfs:comment>
        securityl-landler is a security service to authorize users
        </rdfs:comment>
        <rdfs:range rdf.resoui-
```

TABLE 1-continued

Activity Ontology Representation Example

```
ce="http://www.w3.org/2001/XMLSchenla#anyURI ">
<daml:DatatypeProperty>
<daml:Class rdf.ID="GridFTP">
    <daml:intersectionOf rdf-.parseType--"daml: collection">
        <darnl:Class rdf.about--"#Activity">
        <daml: Restriction>
            <daml:onProperty rdf. resource= Vsource">
        </daml:Restriction>
        <daml:Restriction>
            <daml:onProperty rdf.resource="#destination",>
        </daml:Restriction>
    </daml:intersectionOf>
</daml:Class>
<daml: DatatypeProperty rdf ID="source">
        <rdfs:comment>This is the source for
        GridFTP -./rdfs: comment>
        <rdfs:type rdf:resource="http://vww.w3.org/2001/10/daml+oil
#UniqueProperty" />
        <rdfs:range
rdf.resource="http://www.w3.org/2001/XMLSchema#anyURI>
<daml:DatatypeProperty>
<daml:DatatypeProperty rdf. ID="destination">
        <rdfs:comment>This is the destination for GridFTP
</rdfs:comment>
        <rdfs:type
rdfresource="http://www.w3.org/2001/10/daml+oil#UniqueProperty" >
        <rdfs:range rdf.resource--
"http://www.w3.org/2001/XMLSchema#anyURI>
<daml:DatatypeProperty>
<daml:Class rdf:ID=FTP">
        <daml:intersectionOf rdf:parseType="daml:collection">
        <daml:Class rdf about="Activity ">
        <daml:Restriction>
            <daml:onProperty rdfresource="#getFrom"/>
        </daml:Restriction>
        <daml:Restriction>
            <daml:onProperty rdf.-resource="#sendTo"/>
        </daml:Restriction>
    </daml:intersectionOf>
</daml:Class>
<daml:DatatypeProperty rdfID="getFrom">
        <rdfs:comment>This is the source for FTP <rdfs:comment>
        <rdfs:type
rdf:resource="http://www.w3.org/2001/10/daml+oil#UniqueProperty" />
        <rdfs:range
rdf:resource="http://www.w3.org/2001/XMLSchema#anyURI>
<daml:DatatypeProperty>
<daml:DatatypeProperty rdf:ID="sendTo">
        <rdfs:comment>This is the destination for
        FTP </rdfs:comment>
        <rdfs:type
rdf:resource="http://www.w3.org/2001/10/daml+oil+UniqueProperty" />
        <rdfs:range rdf-
.resource="http://www.w3.org/2001/XMLSchema#anyURI ">
<daml:DatatypeProperty>
</rdf:RDF>
```

And the flexible linkage, which provides constraints to the relationship between the individual activities, is defined in Table 2. For the purpose of simplicity, we choose to use SRML (Simple Rule Markup Language) proposed by Margaret Thorpe and Charighai Ke, ILOG, S.A. as our expression language to explain our ideas. Other rule languages like BRML (Business Rules Markup Language) from IBM can be used in the same manner.

TABLE 2

Flexible linkage between individual activities Example

```
<rdfRDF xmlns:rdf="http://www.w3.org/1999/02/22-rdf-syntax-ns#"
    xmlns: PDFNsId2="http://www.ydt.com/dc/directory/ruleset#">
<RDFNsId2:ruieset rdf:ID="ruleset1">
```

TABLE 2-continued

Flexible linkage between individual activities Example

```
<rule name="switchToRFT">
<conditionPart>
    <simpleCondition className="FileToTransfer"
    objectVariable="s ">
        <binaryExp operator="gte "> <field name="fileSize"/>
        <constant type="float" value="100" unit="MB "/>
        </binaryExp>
    </simpleCondition>
</conditionPart>
<actionPart>
 <modify>
  <variable name="s"/>
  <assignment>
        <field name="actname"/>
        <constant type="String" value="GridFTP"/>
    </assignment>
 </modify>
</actionPart>
 </rule>
<rule name= "switchToFTP">
<conditionPart>
    <simpleCondition className="FileToTransfer"
"objectVariable="s">
        <binaryExp operator="lt "> <Field name="fileSize"/>
        <constant type="float" value="100" unit="MB"/>
        </binaryExp>
    </simpleCondition>
</condition Part>
<actionPart>
    <modify>
        <variable name="s"/>
        <assignment>
            <field name="actname"/>
            <constant type="String" value="TTP"/>
        </assignment>
    </modify>
</actionPart>
 </rule>
</RDFNsId2:ruleset>
</rdf:RDF>
```

Not only a simple linkage such as below

If File To TransferfileSize>=100 MB, switch to Grid-FTP.

If File To TransferfilleSize<=100 MB, switch to FTR can be expressed in our ActivityChain Ontology, but also more complex relationships between individual activities can be expressed freely and captured by the Action Manager, which helps smartly monitoring and managing the activities. For example, an exception like file transferring failure in GridFTP, a restart action can be invoked after a certain amount of time.

The main goal of action manager 12 is to provide a "Plug-and Play" mechanism for integrating new applications into the overall on demand collaboration infrastructure. Countering to the one-to-one, wired integration, action manager provides a way to enable integration based on high-level, descriptive business process integration requirements and flexible linkages expressing complex relationship between individual activities.

The action manager components are shown in FIG. 4. The key components in action manager are the activity parser 41, the event capture 42, the controller 43, the access control utility 44, the activity ontology 45, the exception handler 46, and the adaptation layers 47$_1$ to 47$_n$. The purpose of the activity parser 41 is to retrieve the integration activity name from an input parameter, such as an RDF String or an annotated CxP message. The event capture 42 captures the event, such as a designer having finished a CAD (computer aided design) design document. This act may later trigger an activity, which is to notify the design partner that the design document is done. The access control utility 44 checks the authorization of all access to the resources/application integrated and managed by the activity manager, ensuring all accesses are authorized.

The core of our action manager is the controller 43, whose job is to accept an integration action request obtained by the activity parser 41 and to invoke the corresponding activity based on the activity name. It also accepts internal activity such as the ones triggered by event capture 42 for behavior internal to the system. Before the actual invocation of the corresponding activity, the access control utility 44 checks to ensure the invocation is within the valid scope of the security domain by consulting the ActivityChain ontology 45 for the valid parameter requirements and the conditions between the activities having been satisfied. Another important function of the controller 43 is when some exception occurs during some activity execution, the controller will react by taking some action.

Exception handler 46 monitors all activities at runtime. When an exception occurs, it makes decisions based on the specification in the Activity ontology and triggers the appropriate action of the Controller. Adaptation layers 47₁ to 47₁ are another key component, which realizes the "adaptive" feature of the action manager. Each adaptation layer has to be created for each integration activity. All the adaptation layers have the same input interface which will accept a XML (eXtensible Markup Language) string as its input parameter. One particular adaptation layer will get the parameters from the XML string and create the required parameter invocation sequence, then do actual invocation on the corresponding application. Each adaptation layer itself is web-service based, therefore, platform-independent. To construct a collaborative message or RDF String correctly, ActivityChain ontology has to be consulted.

An example using HTTP (HyperText Transfer Protocol) File Transfer is used to explain the life cycle of an integration activity managed by the action manager. There are only three easy steps.

The first step is to capture this new activity in Activity-Chain ontology, which will be used by the controller 43 and exception handler 46 in the activity manger. Table 3 below describes the activity ontology for integrating HTTP File Transfer:

TABLE 3

Individual Activity ontology Example

<daml:Class rdfID="HTTP">
   <daml:intersectionOf rdf:parseType="daml:collection">
     <daml:Class rdf:about="#Activity"/>
     <daml:Restriction>
       <daml:onProperty rdf:resource="#getFile"/>
     </darnl: Restriction>
   </daml:intersectionOf>
</daml:Class>
<daml:DatatypeProperty rdHD="getFile">
      <rdfs:comment>This is the URL for HTTP File Transfer
</rdfs:comment>
     <rdfs:type
rdf:resource="http://www.w3.org/2001/10/daml+oil#UniqueProperty" />
     <rdfs:range
rdf:resource="http://www.w3.org/2001/XMLSchema#anyURI ">
<daml:DatatypeProperty>

The next step is to use a GUI (Graphic User Interface) tool or manually to add this extended part shown in Table 2 into the existing ActivityChain ontology as previously shown in FIG. 3. The third step is to develop the adaptation layer for this activity by implementing the pre-defined interface that is known to the action manager. The implementation of the adaptation layer can be realized by a Web service, which, as an example, is created out of a Javabean. The Web service would accept a XML String as the input parameter, which is an instance matching the ActivityChain ontology. The implementation class is responsible for constructing the input parameters as needed and do the actual invocation. Next, WSDL (Web Services Definition Language) files can be generated from the Javabean class and publish it as a Web Service. In our example, WSDL files are generated via WebSphere Application Developer Studio, as shown in Table 3. Other tools can also be used. In HTTP Adaptor-service.wsdl, a service called HTTP AdaptorService is defined including the binding information and soap address.

TABLE 4

WSDL for HTTP File Transfer activity

HTTPAdaptor-service.wsdl
<?xml version="1.0 " encoding="UTF-8 "?>
<definitions name="HTTPAdaptorService "
   targetNamespace="
http://localhost:8080/CxPMessenger/wsdl/HTTPAdaptor-service.wsdl"
   xmlns="http://schemas.xmlsoap.org/wsdl/"   xmlns:binding="
http://www.httpadaptor.com/definitions/HTTPAdaptorRemoteInterface"
xmlns:soap="http://schemas.xmlsoap.org/wsdl/soap/l, xmins:tns=">
http://localhost:8080/CxPMessenger/wsdl/HTTPAdaptor-service.wsdl">
     <import   location="
http://localhost:8080/CxPMessenger/wsdl/HTTPAdaptor-binding.wsdl"
namespace="
http://www.httpadaptor.com/definitions/HTTPAdaptorRemoteInterface"/>
   <service name="HTTPAdapterService ">
     <port binding="binding:HTTPAdaptorBinding"
name="HTTPAdaptorPort ">
       <soap:address location="
http://localhost:8080/CxPMessenger/servlet/rpcrouter"/>
     </port>
   </service>
</definitions>

In HTTPAdaptor-binding.wsdl, message "getFileRequest", message "getFileResponse", portType "HTTPAdaptor" and the binding information are defined. The portType "HTTPAdaptor" accept message "getFileRequest" as input and output message "getFileResponse" message, Inside the binding the operation name, input output are defined. The operation name has to match the activity name—"HTTP". The input is message "getFileRequest" which must be a XML string.

HTTPAdaptor-binding.wsdl
<?xml version="1.0 " encoding="UTF-8 "?>
<definitions name="HTTPAdaptor-binding"
   targetNamespace="
http://www.rftadaptor.com/definitions/HTTPdaptorRemoteInterface"
   xmlns="http://schemas.xmlsoap.org/wsdl/"
   xmlns:soap=http://schemas.xmlsoap.org/wsdl/soap/
xmlns:tns=
"http://www.rftadaptor.com/definitions/HTTPAdaptorRemoteInterface"
   xmlns:xsd="http://www.w3.org/2001/XMLSchema">
   <message name="getFileRequest">
     <part name="xmlStr " type="xsd:string "/>
   </message>
   <message name="getFileResponse"/>
   <portType name="HTTPAdaptor">

-continued

```
    <operation name="HTTP " parameterOrder="xmlStr ">
        <input message="getFileRequest" name="getFileRequest "/>
        <output message="tns:getFileResponse"
name="getFileResponse "/>
    </operation>
  </portType>
  <binding name="HTTPAdaptorBinding" type="tns:HTTPAdaptor ">
    <soap:binding style="rpc" transport="
http://schemas.xmlsoap.org/soap/http"/>
    <operation name="HTTP">
        <soap:operation soapAction="" style="rpc"/>
        <input name="getFileRequest">
        <soap:body
encodingStyle="http://schemas.xmlsoap.org/soap/encoding/"
            namespace="http://tempuri.org/HTTPAdapt6r"
use="encoded"
/>
        </input>
        <output name="getFileResponse">
          <soap:body
            encodingStyle=
            "http://schemas.xmlsoap.org/soap/encoding/"
            namespace="http://tempuri.org/HTTPAdaptor"
use="encoded"
/>
        </output>
    </operation>
  </binding>
</definitions>
```

And that is all we need to do to incorporate HTTP File Transfer activity into our action manager. This example demonstrates that a small amount of code is required to add a new integration activity to the On Demand Business Collaboration infrastructure.

In summary, a business process is a structured, measured set of activities designed to produce a specified output for a particular customer or market. But how to efficiently and effectively integrate applications into the existing business process and cover dynamic business process flow are real challenges for business process integration. This invention introduces a notion, ActivityChain ontology, and also the enabling infrastructure to address the above challenge. By using ActivityChain ontology, the high-level business process integration requirements are captured in a flexible and extensible way, which minimizes the code needed to be created as well as reduces the time and cost for integration While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for executing an integration activity chain for on demand business process integration comprising the steps of:
   receiving the integration activity's properties in a data string for execution from an event bus;
   parsing events from the received data string, said data string optionally including an annotation specifying an action for integration;
   controlling integration activity execution through consulting an on demand business collaboration ontology and an access control utility;
   coordinating with an exception handler when there is a business exception which comes from integrated applications; and
   performing integration activity execution by invoking an adaptation layer implementation,
   wherein if said action is a new integration activity said adaptation layer implementation is responsive to said action specified by said annotation,
   wherein the integration activity chain represents a set of integration activities in a pre-defined manner, and
   wherein the pre-defined manner is represented in a work flow document.

2. The method for executing an integration activity chain for on demand business process integration recited in claim 1, wherein the integration activity chain represents a set of non-deterministic activities triggered by manual operation or by program code automatically in a multi-step manner.

3. The method for executing an integration activity chain for on demand business process integration recited in claim 1, wherein the event bus comprises one of an XML string, plain text, binary data stream, or graphic user interface events.

4. The method for executing an integration activity chain for on demand business process integration recited in claim 1, wherein said integration activity's properties comprise one or more of the integration activity's name, description of the integration activity, scheduled execution script, pre-integration activity, post-integration activity, and execution channel.

5. The method for executing an integration activity chain for on demand business process integration recited in claim 1, wherein said adaptation layer implementation includes adaptation components associated with business applications.

6. The method for executing an integration activity chain for on demand business process integration recited in claim 5, wherein said business applications include Reliable File Transfer Protocol (RFTP).

7. The method for executing an integration activity chain for on demand business process integration recited in claim 5, wherein said business applications include File Transfer Protocol (FTP).

* * * * *